US008619102B2

(12) United States Patent
Chen et al.

(10) Patent No.: US 8,619,102 B2
(45) Date of Patent: Dec. 31, 2013

(54) DISPLAY APPARATUS AND METHOD FOR ADJUSTING BRIGHTNESS THEREOF

(75) Inventors: Han Feng Chen, Suwon-si (KR); Yung-jun Park, Yongin-si (KR); Jun-ho Sung, Seoul (KR); Hoon Choi, Hwaseong-si (KR); Jun-ho Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1002 days.

(21) Appl. No.: 12/016,245

(22) Filed: Jan. 18, 2008

(65) Prior Publication Data

US 2008/0252666 A1 Oct. 16, 2008

(30) Foreign Application Priority Data

Apr. 12, 2007 (KR) ........................ 10-2007-0036065

(51) Int. Cl.

| | |
|---|---|
| ***G09G 5/10*** | (2006.01) |
| ***G09G 5/00*** | (2006.01) |
| ***G09G 3/36*** | (2006.01) |
| ***G06F 3/038*** | (2013.01) |

(52) U.S. Cl.
USPC ............... 345/690; 345/204; 345/87; 345/88; 345/89; 345/102

(58) Field of Classification Search
USPC .............................. 345/204, 690, 87–90, 102
See application file for complete search history.

(56) References Cited

U.S. PATENT DOCUMENTS 7,460,103 B2 12/2008 Konno et al.
2004/0257329 A1 12/2004 Park et al.
2005/0062698 A1* 3/2005 Hong .............................. 345/87
2005/0184952 A1 8/2005 Konno et al.
2007/0216636 A1* 9/2007 Lo ................................ 345/102
2007/0279368 A1* 12/2007 Shefter .......................... 345/102
2009/0040171 A1* 2/2009 Ishizumi et al. .............. 345/102

FOREIGN PATENT DOCUMENTS

EP 1111578 A1 6/2001
JP 2001-142409 A 5/2001
JP 2005-258403 A 9/2005
WO 2007/007472 A1 1/2007
WO WO 2007007472 A1 * 1/2007

OTHER PUBLICATIONS

Chen et al., "Locally pixel-compensated backlight dimming on LED-backlit LCD TV" Journal of the SID 15/12, 2007.*
Extended European Search Report issued on Apr. 21, 2011 in the corresponding European Patent Application No. 08150901.0.
Communication, dated Feb. 7, 2012, issued by the Japanese Patent Office in corresponding Japanese Application No. 2008-000395.

* cited by examiner

*Primary Examiner* — Ilana Spar
(74) *Attorney, Agent, or Firm* — Sughrue Mion, PLLC

(57) ABSTRACT

A display apparatus and a method for adjusting brightness thereof are provided. The display apparatus includes a panel unit which displays a video signal, a light emitting unit which provides the panel unit with a ray of light and causes the video signal to be visualized, a light emission control unit which controls the light emitting unit so that the ray of light is provided to each of local areas of the panel unit, and a panel control unit which compensates pixels of the video signal in each of local areas, to remove an artifact which is generated due to the ray of light provided to local areas of the panel unit. Because brightness of a screen is adjusted in each of local areas, contrast ratio is enhanced, and improved image quality is provided.

25 Claims, 10 Drawing Sheets

| | | | | | | | |
|---|---|---|---|---|---|---|---|
| 8.83 | 20.1 | 46.5 | 20 | 7.46 | 3.85 | 2.79 | 2.43 |
| 9.27 | 24.5 | 142 | 24.4 | 7.59 | 3.81 | 2.75 | 2.4 |
| 8.08 | 18.1 | 56.1 | 18.3 | 6.59 | 3.56 | 2.68 | 2.42 |
| 6.35 | 10.4 | 16.6 | 10.3 | 4.84 | 3.2 | 2.54 | 2.34 |
| 4.92 | 5.26 | 7.87 | 5.81 | 3.79 | 2.79 | 2.5 | 2.33 |
| 4.1 | 4.5 | 4.94 | 4.19 | 3.06 | 2.56 | 2.4 | 2.29 |
| 3.52 | 3.66 | 3.76 | 3.53 | 2.94 | 2.47 | 2.33 | 2.25 |
| 3.52 | 3.74 | 3.89 | 3.73 | 3.16 | 2.75 | 2.49 | 2.24 |

DISPLAY APPARATUS AND METHOD FOR ADJUSTING BRIGHTNESS THEREOF

CROSS-REFERENCE TO RELATED APPLICATIONS

This application claims priority from Korean Patent Application No. 10-2007-0036065, filed on Apr. 12, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus and a method for adjusting brightness thereof, and, more particularly, to a display apparatus which is capable of adjusting brightness of a screen locally, according to an incoming video signal, and a method for adjusting brightness thereof.

2. Description of the Related Art

Displays such as Liquid Crystal Displays (LCD) in TVs, laptops, or desktops represent images thereon. Because these types of displays do not generate lights by themselves, they require a separate light source to emit a ray of light. An LCD generally has an LCD panel and a light emitting unit with a backlight at the back of the LCD panel, and displays an image, while appropriately adjusting the LCD panel's transmissivity for the light radiating from the light emitting unit.

Related art LCD generally use a uniform backlight for the light emitting unit, which supplies light over the entire LCD panel in a uniform manner. When the uniform backlight is used, all the images, including dark and bright images, are represented by the light of the same level of brightness. Images including fireworks or explosions have some parts that need be represented by higher brightness, but due to the absence of counterbalance measures, it is difficult to represent lively images.

Additionally, the light generated at the uniform backlight falls onto the LCD panel, causing interference. As a result, a LCD is unable to display zero-pixel image as a true black image, and also has degradation of contrast ratio. Power consumption also increases, because uniform backlight emits the same brightness light even for a dark image which can be represented by a dimmer light.

SUMMARY OF THE INVENTION

Exemplary embodiments of the present invention address the above disadvantages and other disadvantages not described above. Also, the present invention is not required to overcome the disadvantages described above, and an exemplary embodiment of the present invention may not overcome any of the problems described above.

The present invention provides a display apparatus capable of adjusting brightness of light emitting unit in local areas of a screen, according to an incoming video signal, and a method for adjusting brightness thereof.

The present invention also provides a display apparatus capable of pixel compensation in local areas, to prevent loss of video signal due to a light emitting unit having locally adjusted brightness, and a method for adjusting brightness thereof.

The present invention also provides a display apparatus capable of adjusting brightness and compensating pixels with respect to an entire screen according to an incoming video signal, and preventing unnecessary power consumption.

According to an aspect of the present invention, there is provided a display apparatus, which may include a panel unit which displays a video signal, a light emitting unit which provides the panel unit with a ray of light and causes the video signal to be visualized, a light emission control unit which controls the light emitting unit so that the ray of light is provided to each of local areas of the panel unit, and a panel control unit which compensates pixels of the video signal in each of local areas, to remove an artifact which is generated due to the ray of light provided to the local areas of the panel unit.

The panel control unit compensates the pixels of the local areas, using representative values which are computed by the light emission control unit to control the light emitting unit.

The light emission control unit computes representative values according to the size of RGB pixels of the respective local areas of the incoming video signal, so that the light emitting unit is controlled to provide the panel unit with the ray of light according to the representative values.

The panel control unit computes compensated R'G'B' pixels, by applying pixel compensation coefficients to mathematical formula:

$$R' = \min(255, R * f_c)$$

$$G' = \min(255, G * f_c)$$

$$B' = \min(255, B * f_c)$$

where R, G, B denote pixels before the compensation, R'G'B' denote pixels after the compensation, and $f_c$ denotes compensation coefficient.

The panel control unit computes the compensation coefficient using mathematical formula:

$$f_c(i,j) = 1 + Thr \cdot LUT_{BLU}(f_b(i,j)) \cdot (LUT_{GRAY}(Y(i,j)))$$

where $f_c(i, j)$ denotes a compensation coefficient of the (i, j)th pixel, Thr denotes a parameter for controlling a compensation gain, $f_b(i, j)$ denotes an interpolated brightness of the (i, j)th pixel, $LUT_{BLU}(f_b(i, j)$ denotes an interpolated $f_b(i, j)$ based on the lookup table, Y(i, j)=max(R(i, j), G(i, j), B(i, j)), and $LUT_{GRAY}(Y(i, j)$ denotes an interpolated value of Y(i, j) based on the lookup table.

The panel control unit computes the compensated brightness, by interpolating an estimate brightness obtained by mathematical formula:

$$f_E(m, n) = \sum_{k}^{BLK\_NUM} (L_{LD}(k) * W_k(m, n))$$

where $f_E(m, n)$ denotes estimate brightness of the respective local areas of the (m×n) screen, BLK_NUM denotes the total number of local areas, $L_{LD}(k)$ denotes a representative value of a local area (k), and $W_k(m, n)$ denotes optical profile data of (m, n)th local area (k).

The light emission control unit computes a local graylevel histogram of the greatest pixel of the RGB pixels, and computes a local representative value using mathematical formula:

$$L_{init}(k) = f\left(\text{L\_Thr} \cdot \text{BLK\_NUM}\left(\sum_{i=1}^{N_h} (N_i \cdot M_i^2)\right)\right)$$

where $L_{init}(k)$ denotes an initial representative value of a local area (k), L_Thr denotes a predetermined coefficient for the brightness compensation of the local area (k), BLK_NUM denotes a total number of local areas, $N_h$ denotes the number of graylevels, $N_i$ denotes the number of pixels belonging to the (i)th graylevel of the graylevel histogram, and $M_i$ denotes an average pixel of the (i)th graylevel of the graylevel histogram of the local area (k).

The light emission control unit performs spatial and temporal filtering of the initial representative value, and outputs a representative value for controlling the light emitting unit.

The panel control unit compensates brightness of the entire screen in consideration of the adjustment of the representative values by the pixels.

The light emission control unit computes a ratio by mathematical formula below, and the representative values of the entire screen are adjusted uniformly according to the computed ratio:

$$R_{GD}=A/(A+\text{Thr2}*(255-A))$$

where $R_{GD}$ denotes the ratio, A denotes a cut-off graylevel, and Thr2 denotes a threshold of 0-1.

The cut-off graylevel is the maximum graylevel which meets mathematical formula:

$$\sum_{g=0}^{A} H(g) \geq \text{Cut\_Thr, and } \sum_{g=0}^{A-1} H(g) < \text{Cut\_Thr}$$

where g denotes 0 to 255 graylevels, H(g) denotes the number of pixels belonging to graylevel (g), and Cut_Thr denotes a predetermined threshold at which there are a plurality of pixels belonging to 0 to A graylevels.

The panel control unit computes R"G"B" pixels which are compensated by mathematical formula:

$$R''=\min(255,R'*(f_{IIR}(1/R_{GD}))^{\gamma})$$

$$G''=\min(255,G'*(f_{IIR}(1/R_{GD}))^{\gamma})$$

$$B''=\min(255,B'*(f_{IIR}(1/R_{GD}))^{\gamma})$$

where $f_{IIR}$ denotes an Infinite Impulse Response (IIR) low pass filter, and γ denotes a gamma compensation coefficient.

The panel control unit removes a contour artifact by dithering the R'G'B' pixels.

According to another aspect of the present invention, there is provided a method for adjusting brightness of a display apparatus comprising a panel unit which displays a video signal, and a light emitting unit which provides the panel unit with a ray of light and causes the video signal to be visualized, which may include controlling the light emitting unit so that the ray of light is provided to each of local areas of the panel unit, and compensating pixels of the video signal in each of local areas, to remove an artifact which is generated due to the ray of light provided to local areas of the panel unit.

The compensating may include compensating the pixels of the local areas, using representative values which are computed by the light emission control unit to control the light emitting unit.

The controlling the light emitting unit may include computing representative values according to the size of RGB pixels of the respective local areas of the incoming video signal, so that the light emitting unit is controlled to provide the panel unit with the ray of light according to the representative values.

The compensating the pixels may include computing compensated R'G'B' pixels, by applying pixel compensation coefficients to mathematical formula:

$$R'=\min(255,R*f_c)$$

$$G'=\min(255,G*f_c)$$

$$B'=\min(255,B*f_c)$$

where R, G, B denote pixels before the compensation, R'G'B' denote pixels after the compensation, and $f_c$ denotes compensation coefficient.

The compensating the pixels may include computing the compensation coefficient using mathematical formula:

$$f_c(i,j)=1+Thr\cdot LUT_{BLU}(f_b(i,j))\cdot(LUT_{GRAY}(Y(i,j)))$$

where $f_c$ (i, j) denotes a compensation coefficient of the (i, j)th pixel, Thr denotes a parameter for controlling a compensation gain, $f_b$(i, j) denotes an interpolated brightness of the (i, j)th pixel, $LUT_{BLU}(f_b(i,j)$ denotes an interpolated $f_b$(i, j) based on the lookup table, Y(i, j)=max(R(i, j), G(i, j), B(i, j)), and $LUT_{GRAY}$(Y(i, j) denotes an interpolated value of Y(i, j) based on the lookup table.

The compensating the pixels may include computing the compensated brightness, by interpolating an estimate brightness obtained by mathematical formula:

$$f_E(m, n) = \sum_{k}^{BLK\_NUM} (L_{LD}(k) * W_k(m, n))$$

where $f_E$(m, n) denotes estimate brightness of the respective local areas of the (m×n) screen, BLK_NUM denotes the total number of local areas, $L_{LD}(k)$ denotes a representative value of a local area (k), and $W_k$(m, n) denotes optical profile data of (m, n)th local area (k).

The controlling the light emitting unit may include computing a local graylevel histogram of the greatest pixel of the RGB pixels, and computes a local representative value using mathematical formula:

$$L_{init}(k) = f\left(\text{L\_Thr}\cdot\text{BLK\_NUM}\left(\sum_{i=1}^{N_h}(N_i\cdot M_i^2)\right)\right)$$

where $L_{init}(k)$ denotes an initial representative value of a local area (k), L_Thr denotes a predetermined coefficient for the brightness compensation of the local area (k), BLK_NUM denotes a total number of local areas, $N_h$ denotes the number of graylevels, $N_i$ denotes the number of pixels belonging to the (i)th graylevel of the graylevel histogram, and $M_i$ denotes an average pixel of the (i)th graylevel of the graylevel histogram of the local area (k).

The controlling the light emitting unit may include performing spatial and temporal filtering of the initial representative value, and outputs a representative value for controlling the light emitting unit.

Compensating brightness of the entire screen in consideration of the adjustment of the representative values by the pixels, may be further provided.

Computing a ratio by mathematical formula below, and the representative values of the entire screen may be adjusted uniformly according to the computed ratio:

$$R_{GD}=A/(A+Thr2*(255-A))$$

where $R_{GD}$ denotes the ratio, A denotes a cut-off graylevel, and Thr2 denotes a threshold of 0-1.

The cut-off graylevel is the maximum graylevel which meets mathematical formula:

$$\sum_{g=0}^{A} H(g) \geq \text{Cut\_Thr, and } \sum_{g=0}^{A-1} H(g) < \text{Cut\_Thr}$$

where g denotes 0 to 255 graylevels, H(g) denotes the number of pixels belonging to graylevel (g), and Cut_Thr denotes a predetermined threshold at which there are a plurality of pixels belonging to 0 to A graylevels. Computing R"G"B" pixels, which are compensated by mathematical formula, may be further provided:

$$R''=\min(255, R'*(f_{IIR}(1/R_{GD}))^{\Gamma})$$

$$G''=\min(255, G'*(f_{IIR}(1/R_{GD}))^{\gamma})$$

$$B''=\min(255, B'*(f_{IIR}(1/R_{GD}))^{\gamma})$$

where $f_{IIR}$ denotes an Infinite Impulse Response (IIR) low pass filter, and γ denotes a gamma compensation coefficient.

The compensating the pixels comprises removing a contour artifact by dithering the R'G'B' pixels.

The light emitting unit comprises at least one of a plurality of light-emitting diodes, a plurality of cold cathode fluorescent lamps, a plurality of field-effect diodes, and a plurality of surface-conduction electron-emitter displays.

BRIEF DESCRIPTION OF THE DRAWING FIGURES

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Figure 1:
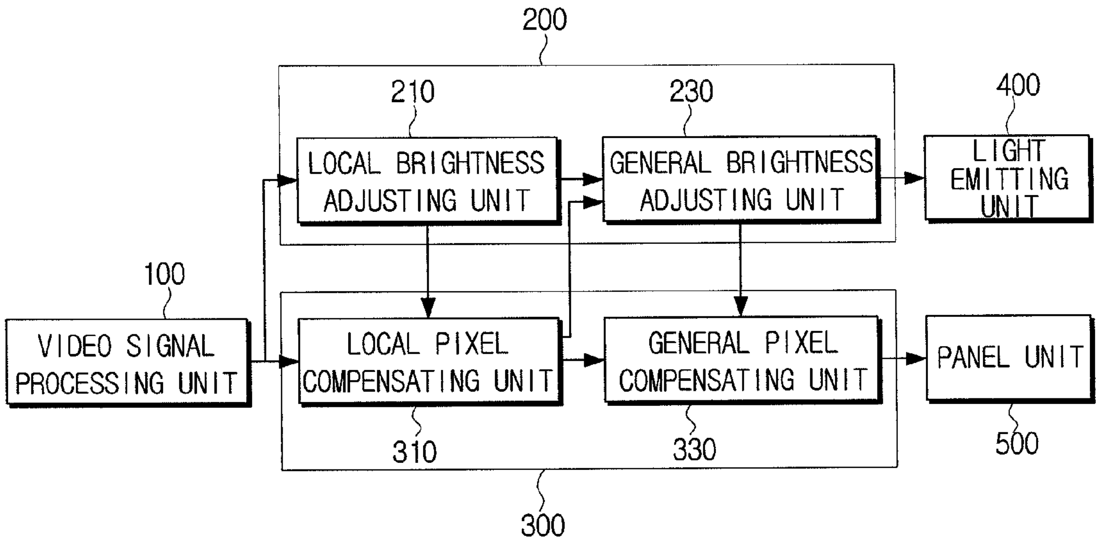
FIG. 1 is a block diagram of a display apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as the detailed construction and elements, are provided to assist in a comprehensive understanding of the invention. Thus, it is apparent that the present inventive concept can be carried out without those specifically defined matters. Also, well-known functions or constructions are not described in detail since they would obscure the invention with unnecessary detail.

FIG. 1 is a block diagram of a display apparatus according to an exemplary embodiment of the present invention.

Referring to FIG. 1, a display apparatus includes a video signal processing unit 100, a light emission control unit 200, a panel control unit 300, a light emitting unit 400, and a panel unit 500.

The light emitting unit 400 includes a plurality of illuminating elements which generate light, and is divided into a plurality of local areas. For example, the light emitting unit 400 may be divided into 8×8 (that is, 64) local areas. Each of the local areas include a one or more illuminating elements which are controlled to have the same brightness, The illuminating elements may include a light-emitting diode (LED), cold cathode fluorescent lamp (CCFL), field-effect diode (FED) or surface-conduction electron-emitter display (SED).

The panel unit 500 adjusts transmissivity of light from the light emitting unit 400, such that a video signal is visualized and displayed on a screen. The panel unit 500 includes two electrode-generated boards facing each other, and liquid crystal material injected between these two boards. As the voltage is applied to the two electrodes, electric field is generated, causing liquid crystal molecules between the two boards to move and accordingly adjust light transmissivity.

The video signal processing unit 100 processes an incoming video signal to suit for the resolution of the panel unit 500, and outputs as a RGB video signal.

The light emission control unit 200 controls the light emitting unit 400 according to a RGB video signal output from the video signal processing unit 100, and accordingly adjusts the brightness of the plurality of illuminating elements of the light emitting unit 400. The light emission control unit 200 includes a local brightness adjusting unit 210 and a general brightness adjusting unit 230.

The local brightness adjusting unit 210 controls the light emitting unit 400 to adjust the local areas of the screen according to luminance value which is computed using a RGB video signal. A representative value is computed using a RGB pixel of each of the local areas, and used in the brightness adjustment of the illuminating elements of the local areas.

The general brightness adjusting unit 230 adjusts the representative values of the local areas according to the same ratio, so that the overall brightness of the screen can be adjusted according to the brightness of the image being displayed on the screen. That is, to represent a relatively dark image, the general brightness adjusting unit 230 controls the light emitting unit 400 so that the brightness of the entire screen is decreased at the same ratio. The brightness of the entire screen may be adjusted with reference to the R'G'B pixels being output from a local pixel compensating unit 310 which will be explained below.

The panel control unit 300 compensates the pixels to be displayed on the panel unit 500, using the RGB video signal being output from the video signal processing unit 100, so that the contrast ratio of the screen is enhanced. The panel control unit 300 includes a local pixel compensating unit 310, and a general pixel compensating unit 330.

The local pixel compensating unit 310 compensates RGB pixels in respective local areas, to offset the loss of video signal due to the local brightness adjustment of the light emitting unit 400. The local pixel compensating unit 310 compensates the RGB pixels to remove artifacts which are generated due to the brightness adjustment of the local areas by the local brightness adjusting unit 210, and outputs the artifact-removed pixels.

In particular, the local pixel compensating unit 310 estimates the brightness of the respective local areas, after an optical profile for the screen is applied, using the representative values which are computed at the local brightness adjusting unit 210. The local pixel compensating unit 310 then compensates the estimated brightness to remove blocking artifacts. The local pixel compensating unit 310 then computes compensation coefficients of the respective local areas using the compensated brightness, and outputs R'G'B' pixels, which are the compensated RGB pixels, using the computed compensation coefficients.

The general pixel compensating unit 330 is able to compensate for the variations of brightness of the screen, as the general brightness adjusting unit 230 adjusts the representative values of the local areas at the same ratio. That is, because the general brightness adjusting unit 230 controls the light emitting unit 400 to cause the overall brightness of the screen to be decreased at the same ratio, contrast ratio is decreased in the dark area, and quality is deteriorated. In order to compensate for this and to achieve representation of an image in its original brightness, the R'G'B' pixels are obtained according to the adjustment ratio of the representative values of the local areas, and output.

The construction and operation of the light emission control unit 200 and the panel control unit 300 according to an exemplary embodiment of the present invention will be explained below in greater detail.

Figure 2:
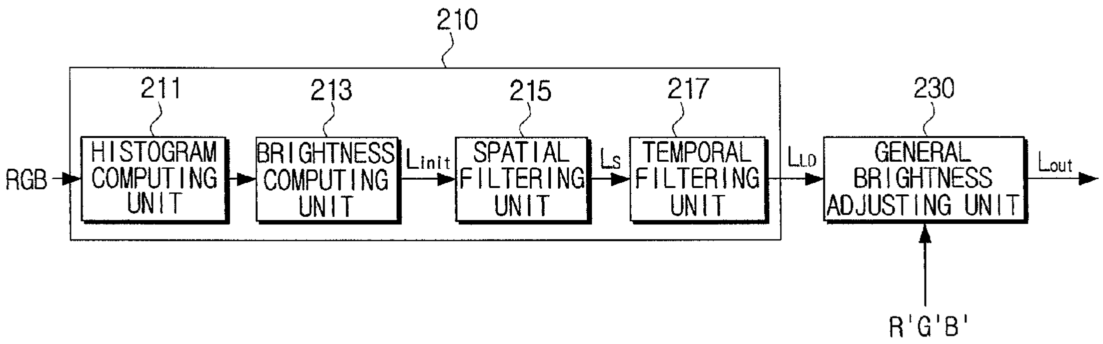
FIG. 2 is a block diagram of a light emission control unit of a display apparatus according to an exemplary embodiment of the present invention.
Figure 3:
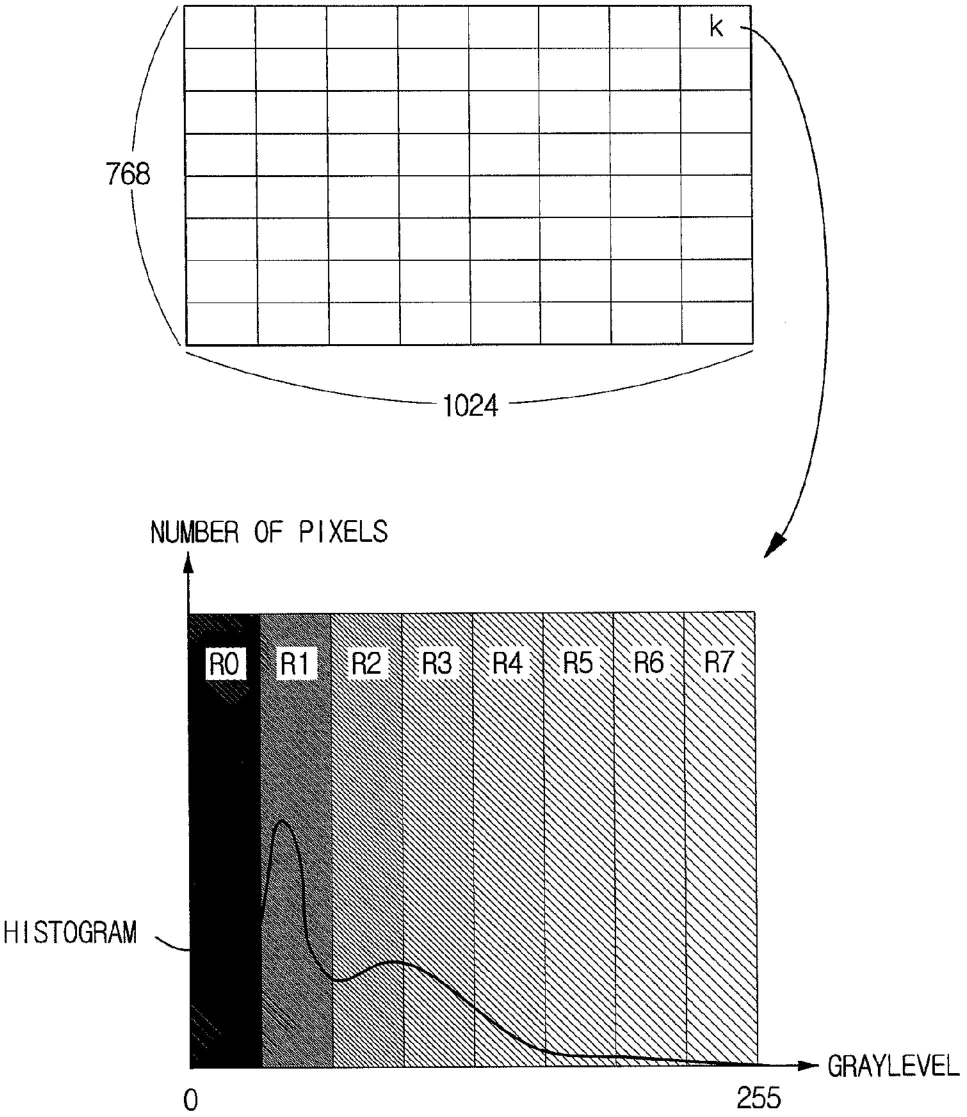
FIG. 3 is a view provided for explaining a method for computing representative values of a light emission control unit of a display apparatus according to an exemplary embodiment of the present invention.

FIG. 2 is a block diagram of a light emission control unit of a display apparatus according to an exemplary embodiment of the present invention, and FIG. 3 is a view provided for explaining a method for computing representative values of a light emission control unit of a display apparatus according to an exemplary embodiment of the present invention.

Referring to FIG. 2, the light emission control unit 200 includes the local brightness adjusting unit 210 which includes a histogram computing unit 211, a brightness computing unit 213, a spatial filtering unit 215 and a temporal filtering unit 217, and the general brightness adjusting unit 230.

As illustrated in FIG. 3, the histogram computing unit 211 computes a graylevel histogram with respect to a local area (k). The histogram computing unit 211 may compute a graylevel histogram, using the pixels that meet the conditions expressed by the mathematical formula 1:

$$Y(i,j)=\max(R(i,j),G(i,j),B(i,j)) \quad \text{[Mathematical formula 1]}$$

where, Y(i,j) denotes brightness of a pixel at coordinates (i,j), R(I,j) denotes R-pixel value of a pixel at coordinates (i,j), G(i,j) denotes G-pixel value of a pixel at coordinates (i,j), and B(i,j) denotes B-pixel value of a pixel at coordinates (i,j). Mathematical formula 1 represents that the largest value of the RGB pixels at coordinates (i,j) is selected as the brightness for the pixel at coordinates (i,j). A graylevel histogram is computed, based on the brightness of the pixels included in one local area (k).

As in the example shown in FIG. 3, the histogram computing unit 211 computes a graylevel histogram using mathematical formula 1, with respect to all the (1024×768) local areas of the screen.

The brightness computing unit 213 computes initial representative value of the local areas, by incorporating the graylevel histogram into mathematical formula 2:

$$L_{init}(k) = f\left(\text{L\_Thr}\cdot \text{BLK\_NUM}\left(\sum_{i=1}^{N_h}(N_i \cdot M_i^2)\right)\right) \quad \text{[Mathematical formula 2]}$$

where $L_{init}(k)$ denotes an initial representative value of a local area (k), L_Thr denotes a predetermined coefficient for the brightness compensation of the local area (k), BLK_NUM denotes a total number of local areas, $N_h$ denotes the number of graylevels, $N_i$ denotes the number of pixels belonging to the (i)th graylevel of the graylevel histogram, and $M_i$ denotes an average pixel of the (i)th graylevel of the graylevel histogram of the local area (k). Referring to the example shown in FIG. 3, $N_h$=8, $N_i$ is the number of pixels belonging to R0 to R7, and $M_i$ is the average pixel in R0 to R7.

The spatial filtering unit 215 spatially filters the initial representative value $L_{init}$, and outputs the result. By applying initial representative values $L_{init}$ to each of the local areas of the light emitting unit 400, blocking artifacts are generated in a still image due to different brightness of the local areas. The initial representative values $L_{init}$ are spatially filtered through the spatial low pass filter to remove the blocking artifacts, and as a result, a filtered, representative value $L_s$ is output.

The temporal filtering unit 217 temporally filters the spatially-filtered representative value $L_s$. When the spatially filtered representative value $L_s$ is applied to the local areas of the light emitting unit 400, flickering occurs in the motion image due to the different brightness of the local areas. The spatially filtered representative value $L_s$ is thus temporally filtered through a temporal low pass filter to remove the flickering. As a result, a temporally filtered representative value $L_{LD}$ is output.

The general brightness adjusting unit 230 adjusts the overall brightness of the screen, using mathematical formula 3, according to the R'G'B' pixels which are compensated and output from the local pixel compensating unit 310.

$$L_{out}(k)=R_{GD}*L_{LD}(k) \quad \text{[Mathematical formula 3]}$$

where $L_{out}(k)$ denotes a final value for adjusting the brightness of the illuminating element(s) of the local area (k), and $R_{GD}$ denotes a ratio for adjusting the entire screen.

Figure 4:
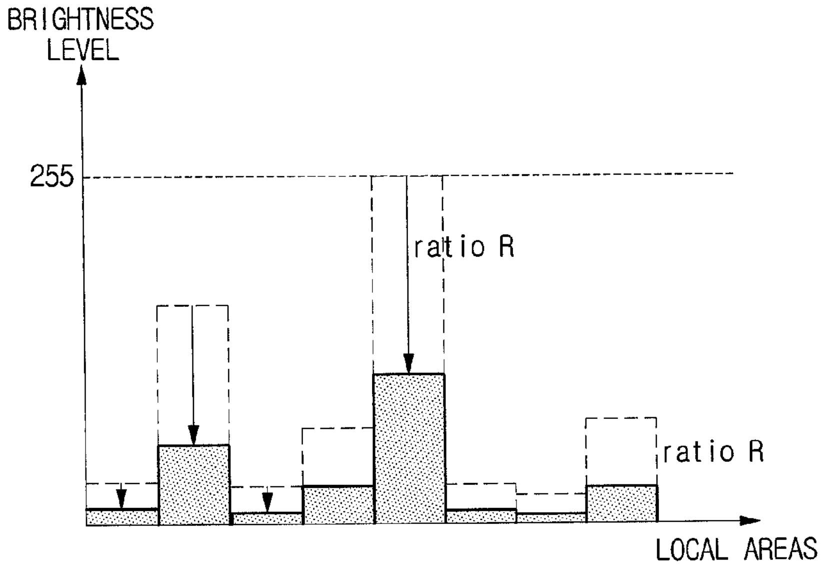
FIG. 4 is a view provided for explaining a method for adjusting brightness of entire screen by a light emission control unit of a display apparatus according to an exemplary embodiment of the present invention.

FIG. 4 is a view provided for explaining a method for adjusting brightness of entire screen by a light emission control unit of a display apparatus according to an exemplary embodiment of the present invention.

Referring to FIG. 4, the brightness of the entire screen is adjusted at the same ratio R, and the ratio R is expressed by mathematical formula 4:

$$R_{GD}=A/(A+Thr2*(255-A)) \quad \text{[Mathematical formula 4]}$$

where $R_{GD}$ denotes a ratio to adjust the overall brightness of the entire screen in a uniform manner, A denotes a cut-off graylevel, which is the maximum graylevel of the pixels of a local area excluding white Gaussian noise, and Thr2 denotes a threshold of 0-1.

The maximum graylevel (A) meets the mathematical formula 5:

$$\sum_{g=0}^{A} H(g) \geq \text{Cut\_Thr}, \quad \text{[Mathematical formula 5]}$$

-continued $$\text{and } \sum_{g=0}^{A-1} H(g) < \text{Cut\_Thr}$$

where g denotes 0 to 255 graylevels, H(g) denotes the number of pixels belonging to graylevel (g), and Cut_Thr denotes a predetermined threshold at which there are a plurality of pixels belonging to 0 to A graylevels.

Figure 5:
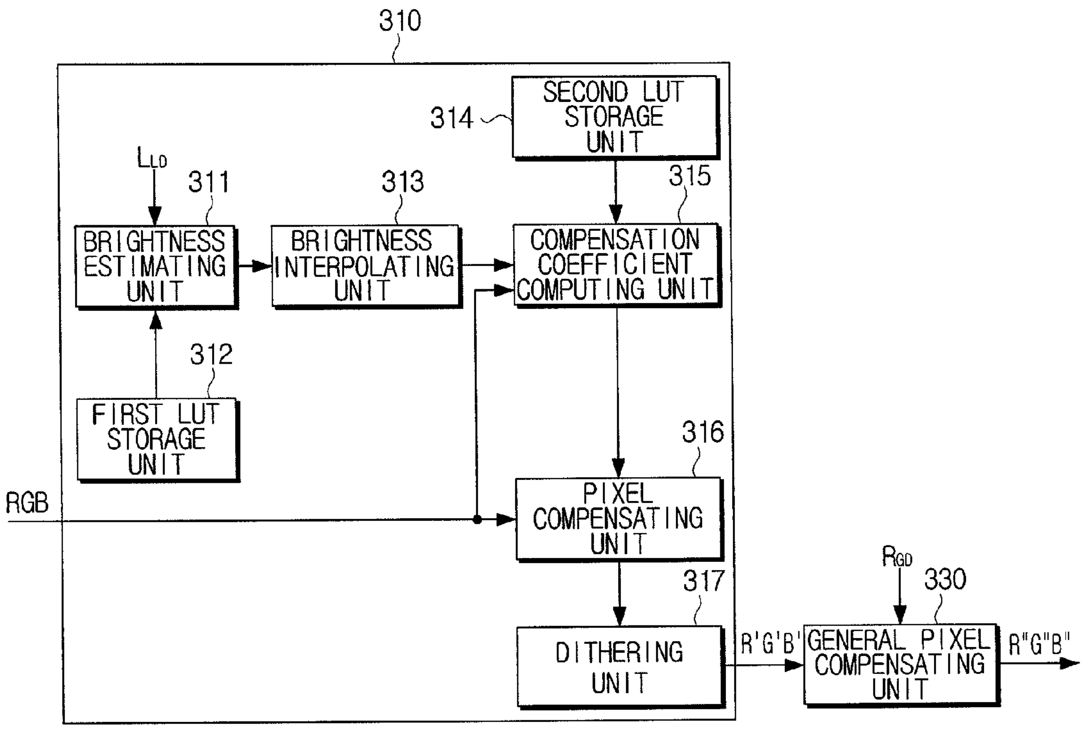
FIG. 5 is a block diagram of a panel control unit of a display apparatus according to an exemplary embodiment of the present invention.

FIG. 5 is a block diagram of a panel control unit of a display apparatus according to an exemplary embodiment of the present invention, and FIGS. 6 to 9 are views provided for explaining a method for compensating pixel values of a panel control unit of a display apparatus according to an exemplary embodiment of the present invention.

Referring to FIG. 5, the panel control unit 300 includes the local pixel compensating unit 310 including a brightness estimating unit 311, a first LUT storage unit 314, a brightness interpolating unit 313, a second LUT storage unit 314, a compensation coefficient computing unit 315, a pixel compensating unit 316, and a dithering unit 317, and the general pixel compensating unit 330.

The brightness estimating unit 311 estimates brightness of each of the local areas, by incorporating the representative value $L_{LD}$, obtained by the local brightness adjusting unit 210, into mathematical formula 6:

$$f_E(m, n) = \sum_{k}^{BLK\_NUM} (L_{LD}(k) * W_k(m, n)) \qquad \text{[Mathematical formula 6]}$$

where $f_E$(m, n) denotes estimate brightness of the respective local areas of the (m×n) screen, BLK_NUM denotes the total number of local areas, $L_{LD}$(k) denotes a representative value of a local area (k), and $W_k$(m, n) denotes optical profile data of (m, n)th local area (k).

Figure 6:
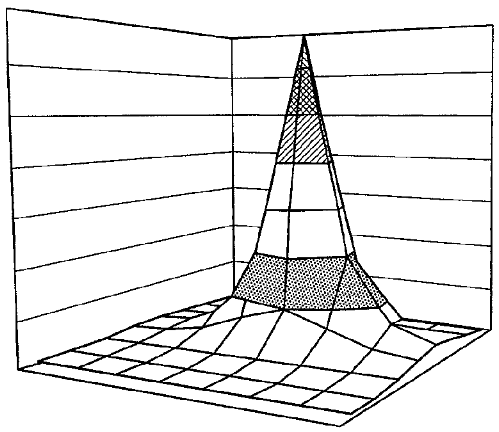
FIGS. 6 to 9 are views provided for explaining a method for compensating pixel values of a panel control unit of a display apparatus according to an exemplary embodiment of the present invention.

The first LUT storage unit 314 stores the optical profile data as a lookup table as illustrated in FIG. 5. FIG. 6 shows optical profile data which is measured from the centre of each of the local areas, when a local area (k) is in on state, while all the other local areas are in off state. As illustrated in FIG. 6, the local area in on state has the greatest brightness, and the brightness gradually decreases towards the local areas farther away from the local area in on state.

Figure 7:
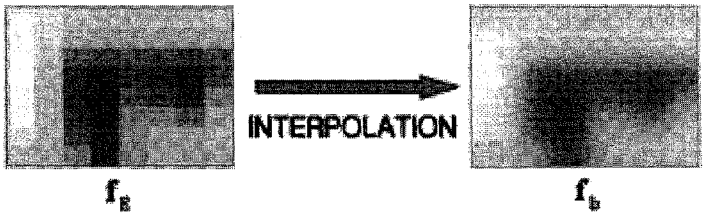

The brightness interpolating unit 313 interpolates (i, j)th pixel of each local area, using the estimate brightness ($f_E$). As the representative value $L_{LD}$ output from the local brightness adjusting unit 210 is applied by the light emitting unit 400, the local areas each has the estimate brightness ($f_E$) as illustrated in FIG. 7, and as a result, blocking artifacts occur. Accordingly, an interpolated pixel ($f_b$) of the (i, j)th pixel is computed to prevent the generating of the blocking artifacts, by applying bi-cubic interpolation or bi-linear interpolation to the estimate brightness ($f_E$).

Figure 8A:
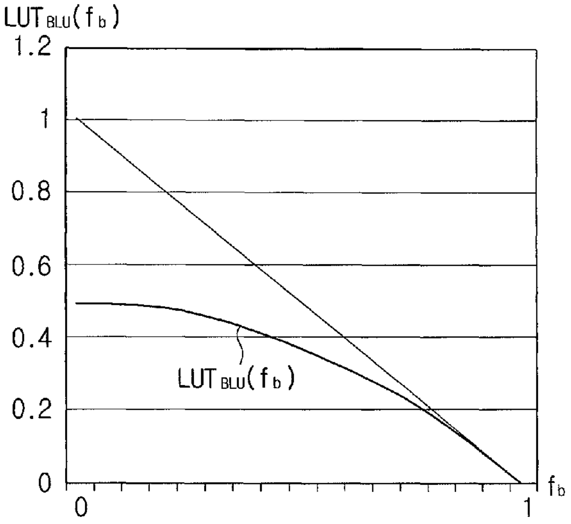
Figure 8B:
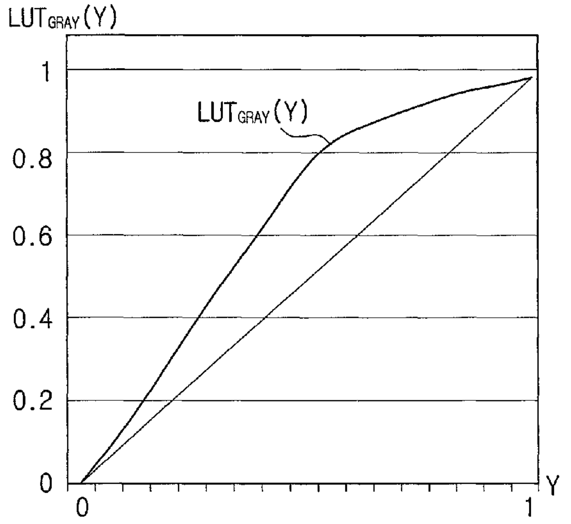
Figure 9:
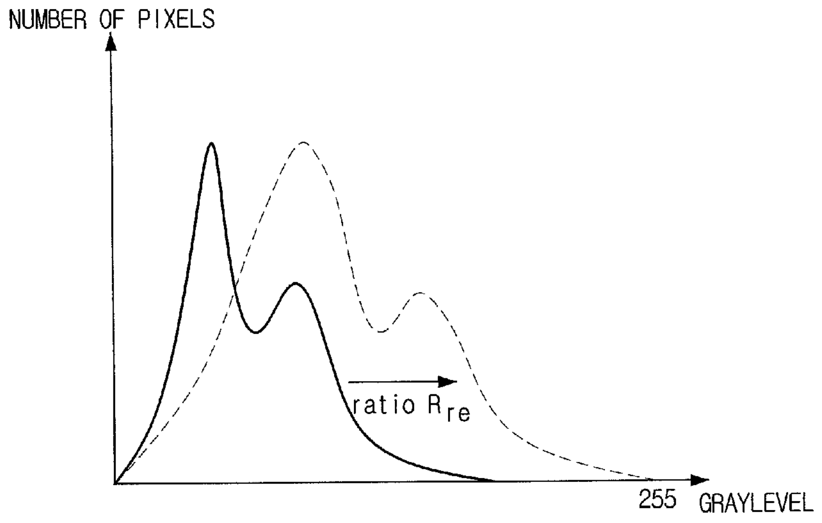

The second LUT storage unit 314 stores lookup tables as the exemplary ones illustrated in FIGS. 8A and 8B. In particular, the second LUT storage unit 314 stores a first lookup table ($LUT_{BLU}$) for compensating the interpolated pixel ($f_b$) of the (i, j)th pixel, and a second lookup table $LUT_{GRAY}$ for compensating a brightness Y of the (i, j)th pixel.

The compensation coefficient computing unit 315 computes a compensation coefficient, using the lookup table of the second LUT storage unit 314 and mathematical formula:

$$f_c(i,j)=1+Thr\cdot LUT_{BLU}(f_b(i,j))\cdot(LUT_{GRAY}(Y(i,j))) \qquad \text{[Mathematical formula 7]}$$

where $f_c$, (i, j) denotes a compensation coefficient of the (i, j)th pixel, Thr denotes a parameter for controlling a compensation gain, $f_b$(i, j) denotes an interpolated brightness of the (i, j)th pixel, $LUT_{BLU}$($f_b$(i, j) denotes an interpolated $f_b$(i, j) based on the lookup table, Y(i, j)=max(R(i, j), G(i, j), B(i, j)), and $LUT_{GRAY}$(Y(i, j) denotes an interpolated value of Y(i, j) based on the lookup table.

The pixel compensating unit 316 compensates the RGB pixel, using the compensation coefficient computed at the compensation coefficient computing unit 315 and mathematical formula below, and outputs a R'G'B' pixel:

$$R'=\min(255,R*f_c)$$

$$G'=\min(255,G*f_c)$$

$$B'=\min(255,B*f_c) \qquad \text{[Mathematical formula 8]}$$

where $f_c$ denotes a compensation coefficient for a RGB pixel. According to mathematical formula above, the smaller value is selected from among 255 and the pixel compensated by the compensation coefficient, so that the R'G'B' pixel does not exceed the maximum brightness, that is, 255, and cause saturation of an image.

The dithering unit 317 dithers the R'G'B' pixel being output from the pixel compensating unit 316 and outputs the result. An image generally has a contour artifact when it is represented using the R'G'B' pixel output from the pixel compensating unit 316, but the contour artifact is removed by the dithering.

The general pixel compensating unit 330 compensates the overall brightness of the screen, which is changed by the general brightness adjusting unit 230, using the dithered R'G'B' pixel from the dithering unit 317. In particular, the general pixel compensating unit 330 compensates the R'G'B' pixel using mathematical formula below, and outputs the compensated R"G"B" pixel:

$$R''=\min(255,R'*R_{re})$$

$$G''=\min(255,G'*R_{re})$$

$$B''=\min(255,B'*R_{re}) \qquad \text{[Mathematical formula 9]}$$

where Rre denotes a coefficient to compensate the overall brightness of the screen which is changed by the general brightness adjusting unit 230. According to mathematical formula 9, a smaller pixel is selected from among 255 and a pixel which is compensated by the coefficient, such that the R"G"B" pixel does not exceed the maximum brightness, that is, 255 and cause saturation of an image. Rre may be computed by incorporating a ratio $R_{GD}$, which is the ratio used to adjust the overall brightness of the screen in a uniform manner, to mathematical formula (see FIG. 9):

$$R_{re}=(f_{IIR}(1/R_{GD}))^{\gamma}$$

where $f_{IIR}$ denotes an Infinite Impulse Response (IIR) low pass filter, and γ denotes a gamma compensation coefficient.

Figure 10:
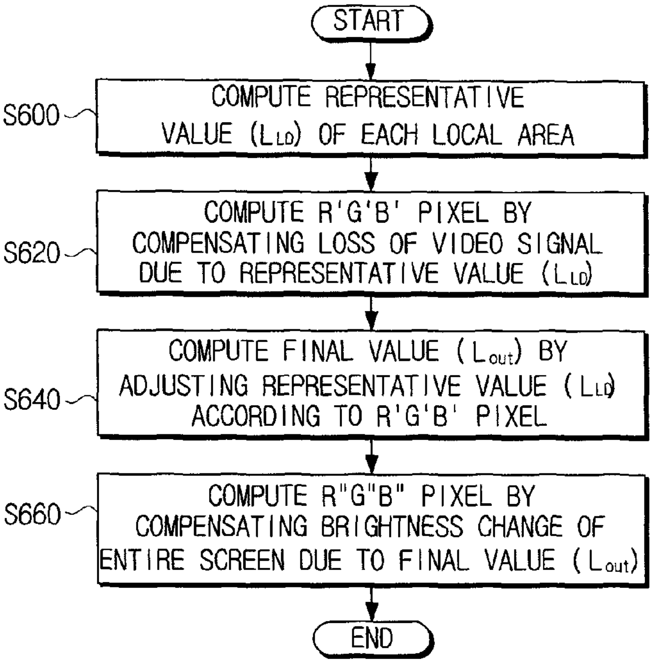
FIG. 10 is a flowchart of a method for adjusting brightness of a display apparatus according to an exemplary embodiment of the present invention.

FIG. 10 is a flowchart of a method for adjusting brightness of a display apparatus according to an exemplary embodiment of the present invention.

Referring to FIG. 10, the local brightness adjusting unit 210 computes a representative value $L_{LD}$ of each local area (S600). The representative values $L_{LD}$ are adjustment values which are used to control the light emitting unit 400 in each of local areas to provide the panel unit 500 with a light, according to the size of the RGB pixels for the respective local areas of the incoming signal.

The local pixel compensating unit 310 computes a R'G'B' pixel, after compensating the loss of a video signal based on the representative value $L_{LD}$ (S620). When controlling the light emitting unit 400 using the representative values $L_{LD}$, different types of artifacts generally occur, hindering accurate representation of an original image and sequentially deteriorating image quality. Accordingly, a R'G'B' pixel is obtained from the incoming RGB pixel, by estimating the influence of adjusting the light emitting unit 400 in each of local areas using the representative values $L_{LD}$.

The general brightness adjusting unit 230 adjusts representative values $L_{LD}$ according to the R'G'B' pixels, and computes the final values Lout (S640). In particular, the general brightness adjusting unit 230 obtains the final values Lout, by adjusting the representative values $L_{LD}$ of the respective local areas based on the same ratio so that the overall brightness of the entire screen is adjusted according to the R'G'B' pixels, and outputs the final values Lout.

The general pixel adjusting unit 330 then computes R"G"B" pixels, by compensating the brightness changes of the entire screen due to the final values Lout (S660). For example, if the light emitting unit 400 is controlled by the general brightness adjusting unit 230 to lower the overall brightness of the screen at the same ratio, the contrast ratio in the relatively dark areas would generally deteriorate. Accordingly, the R'G'B' pixels are compensated to R"G"B" pixels according to the ratio at which the representative values of the respective local areas are adjusted, so that the image can be represented with the brightness of the R'G'B' pixels.

Accordingly, it is possible to control the brightness of the screen and enhance contrast ratio in each of local areas, so that the brightness of the entire screen can be adjusted. The exemplary methods explained above are applicable not only to the LCDs, but to other types of displays that represent video signals.

According to the exemplary embodiments of the present invention as explained above, it is possible to adjust the brightness of the light emitting unit in each of local areas, remove artifacts following the brightness adjustment, and improve contrast ratio of the screen.

Furthermore, it is possible to adjust the brightness of the entire screen, compensate for loss of image due to the adjustment, reduce power consumption, and improve image quality efficiently.

The foregoing exemplary embodiments and advantages are merely exemplary and are not to be construed as limiting the present invention. The present inventive concept can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display apparatus, comprising:

a panel which displays a video signal;

a light emitter which provides the panel with a ray of light and causes the video signal to be visualized;

a light emission controller which controls the light emitter to provide the ray of light to each of local areas of the panel in accordance with brightness values of the corresponding areas of the video signal; and a panel controller which compensates pixels of the video signal in each of the local areas of the panel in accordance with the brightness values of the corresponding areas of the video signal, wherein the light emission controller comprises:

a local brightness adjusting unit which controls the light emitter to adjust brightness of each of the local areas of the panel by using the brightness values, and a general brightness adjusting unit which controls the light emitter to adjust overall brightness of the panel at a same ratio by adjusting the brightness of each of the local areas of the panel at the same ratio using representative values of the local areas of the panel that are computed by the local brightness adjusting unit and the compensated pixels.

2. The display apparatus of claim 1, wherein the panel controller compensates the pixels of the local areas, using representative values of the brightness values which are computed by the light emission controller to control the light emitter.

3. The display apparatus of claim 1, wherein the light emission controller computes representative values according to the size of RGB pixels of the respective local areas of the incoming video signal, so that the light emitter is controlled to provide the panel with the ray of light according to the representative values.

4. The display apparatus of claim 2, wherein the panel controller computes compensated R'G'B' pixels, by applying pixel compensation coefficients to mathematical formula:

$$R'=\min(255,R*f_c)$$

$$G'=\min(255,G*f_c)$$

$$B'=\min(255,B*f_c)$$

where R, G, B denote pixels before the compensation, R'G'B' denote pixels after the compensation, and $f_c$ denotes compensation coefficient.

5. The display apparatus of claim 4, wherein the panel controller computes the compensation coefficient using mathematical formula:

$$f_c(i,j)=1+Thr\cdot LUT_{BLU}(f_b(i,j))\cdot(LUT_{GRAY}(Y(i,j)))$$

where $f_c(i, j)$ denotes a compensation coefficient of the (i, j)th pixel, Thr denotes a parameter for controlling a compensation gain, $f_b(i, j)$ denotes an interpolated brightness of the (i, j)th pixel, $LUT_{BLU}(f_b(i,j)$ denotes an interpolated $f_b(i, j)$ based on the lookup table, Y(i, j)=max(R(i, j), G(i, j), B(i, j)), and $LUT_{GRAY}(Y(i, j)$ denotes an interpolated value of Y(i, j) based on the lookup table.

6. The display apparatus of claim 5, wherein the panel controller computes the compensated brightness, by interpolating an estimate brightness obtained by mathematical formula:

$$f_E(m,n)=\sum_{k}^{BLK\_NUM}(L_{LD}(k)*W_k(m,n))$$

where $f_E(m, n)$ denotes estimate brightness of the respective local areas of the (m×n) screen, BLK_NUM denotes the total number of local areas, $L_{LD}(k)$ denotes a representative value of a local area (k), and $W_k(m, n)$ denotes optical profile data of (m, n)th local area (k).

7. The display apparatus of claim 3, wherein the light emission controller computes a local graylevel histogram of the greatest pixel of the RGB pixels, and computes a local representative value using mathematical formula:

$$L_{init}(k) = f\left(\text{L\_Thr}\cdot\text{BLK\_NUM}\left(\sum_{i=1}^{N_h}(N_i\cdot M_i^2)\right)\right)$$

where $L_{init}(k)$ denotes an initial representative value of a local area (k), L_Thr denotes a predetermined coefficient for the brightness compensation of the local area (k), BLK_NUM denotes a total number of local areas, $N_h$ denotes the number of graylevels, $N_i$ denotes the number of pixels belonging to the (i) th graylevel of the graylevel histogram, and $M_i$ denotes an average pixel of the (i)th graylevel of the graylevel histogram of the local area (k).

8. The display apparatus of claim 7, wherein the light emission controller performs spatial and temporal filtering of the initial representative value, and outputs a representative value for controlling the light emitter.

9. The display apparatus of claim 2, wherein the panel controller compensates brightness of the entire screen in consideration of the adjustment of the representative values by the pixels.

10. The display apparatus of claim 4, wherein the light emission controller computes a ratio by mathematical formula below, and the representative values of the entire screen are adjusted uniformly according to the computed ratio:

$$R_{GD}A/(A+\text{Thr2}*(255-A))$$

where $R_{GD}$ denotes the ratio, A denotes a cut-off graylevel, and Thr2 denotes a threshold of 0-1.

11. The display apparatus of claim 10, wherein the cut-off graylevel is the maximum graylevel which meets mathematical formula:

$$\sum_{g=0}^{A} H(g) \geq \text{Cut\_Thr, and} \sum_{g=0}^{A-1} H(g) < \text{Cut\_Thr}$$

where g denotes 0 to 255 graylevels, H(g) denotes the number of pixels belonging to graylevel (g), and Cut_Thr denotes a predetermined threshold at which there are a plurality of pixels belonging to 0 to A graylevels.

12. The display apparatus of claim 10, wherein the panel controller computes R"G"B" pixels which are compensated by mathematical formula:

$$R''=\min(255,\text{R}'*(255,R'*(f_{IIR}(1/R_{GD}))^{\gamma})$$

$$G''=\min(255,G'*(f_{IIR}(1/R_{GD}))^{\gamma})$$

$$B''=\min(255,B'*(f_{IIR}(1/R_{GD}))\gamma)$$

where $f_{IIR}$ denotes an Infinite Impulse Response (IIR) low pass filter, and γ denotes a gamma compensation coefficient.

13. A method for adjusting brightness of a display apparatus comprising a panel unit which displays a video signal, and a light emitting unit which provides the panel unit with a ray of light and causes the video signal to be visualized, the method comprising:

controlling the light emitting unit so that the ray of light is provided to each of local areas of the panel unit; and compensating pixels of the video signal in each of the local areas of the panel, to remove an artifact which is generated due to the ray of light provided to local areas of the panel unit, and adjusting the brightness values (LLD) of an entire screen for compensating a brightness variation using the compensated pixels of the video signal, wherein the controlling the light emitting unit comprises:

controlling the light emitting unit to adjust brightness of each of the local areas of the panel by using the brightness values, and controlling the light emitting unit to adjust overall brightness of the panel at a same ratio by adjusting the brightness of each of the local areas of the panel at the same ratio using representative values of the local areas that are computed by the local brightness adjusting unit and the compensated pixels.

14. The method of claim 13, wherein the compensating comprises compensating the pixels of the local areas, using representative values which are computed by the light emission control unit to control the light emitting unit.

15. The method of claim 14, wherein the controlling the light emitting unit comprises computing representative values according to the size of RGB pixels of the respective local areas of the incoming video signal, so that the light emitting unit is controlled to provide the panel unit with the ray of light according to the representative values.

16. The method of claim 14, wherein the compensating the pixels comprises computing compensated R'G'B' pixels, by applying pixel compensation coefficients to mathematical formula:

$$R'=\min(255,R*f_c)$$

$$G'=\min(255,G*f_c)$$

$$B'=\min(255,B*f_c)$$

where R, G, B denote pixels before the compensation, R'G'B' denote pixels after the compensation, and $f_c$ denotes compensation coefficient.

17. The method of claim 16, wherein the compensating the pixels comprises computing the compensation coefficient using mathematical formula:

$$f_c(i,j)=1+Thr\cdot LUT_{BLU}(f_b(i,j))\cdot(LUT_{GRAY}(Y(i,j)))$$

where $f_c$ (i, j) denotes a compensation coefficient of the (i, j)th pixel, Thr denotes a parameter for controlling a compensation gain, $f_b$(i, j) denotes an interpolated brightness of the (i, j)th pixel, $LUT_{BLU}(f_b(i,j)$ denotes an interpolated $f_b$(i, j) based on the lookup table, Y(i, j)=max(R(i, j), G(i, j), B(i, j)), and $LUT_{GRAY}$(Y(i, j) denotes an interpolated value of Y(i, j) based on the lookup table.

18. The method of claim 17, wherein the compensating the pixels comprises computing the compensated brightness, by interpolating an estimate brightness obtained by mathematical formula:

$$f_E(m,n) = \sum_{k}^{BLK\_NUM}(L_{LD}(k) * W_k(m,n))$$

where $f_E$(m, n) denotes estimate brightness of the respective local areas of the (m×n) screen, BLK_NUM denotes the total number of local areas, $L_{LD}$(k) denotes a representative value of a local area (k), and $W_k$(m, n) denotes optical profile data of (m, n)th local area (k).

19. The method of claim 15, wherein the controlling the light emitting unit comprises computing a local graylevel histogram of the greatest pixel of the RGB pixels, and computes a local representative value using mathematical formula:

$$L_{init}(k) = f\left(\text{L\_Thr}\cdot\text{BLK\_NUM}\left(\sum_{i=1}^{N_h}(N_i \cdot M_i^2)\right)\right)$$

where $L_{init}(k)$ denotes an initial representative value of a local area (k), L_Thr denotes a predetermined coefficient for the brightness compensation of the local area (k), BLK_NUM denotes a total number of local areas, $N_h$ denotes the number of graylevels, $N_i$ denotes the number of pixels belonging to the (i)th graylevel of the graylevel histogram, and $M_i$ denotes an average pixel of the (i)th graylevel of the graylevel histogram of the local area (k).

20. The method of claim 19, wherein the controlling the light emitting unit comprises performing spatial and temporal filtering of the initial representative value, and outputs a representative value for controlling the light emitting unit.

21. The method of claim 14, further comprising compensating brightness of the entire screen in consideration of the adjustment of the representative values by the pixels.

22. The method of claim 16, further comprising computing a ratio by mathematical formula below, and the representative values of the entire screen are adjusted uniformly according to the computed ratio:

$$R_{GD}A/(A+\text{Thr2}*(255-A))$$

where $R_{GD}$ denotes the ratio, A denotes a cut-off graylevel, and Thr2 denotes a threshold of 0-1.

23. The method of claim 22, wherein the cut-off graylevel is the maximum graylevel which meets mathematical formula:

$$\sum_{g=0}^{A} H(g) \geq \text{Cut\_Thr, and } \sum_{g=0}^{A-1} H(g) < \text{Cut\_Thr}$$

where g denotes 0 to 255 graylevels, H(g) denotes the number of pixels belonging to graylevel (g), and Cut_Thr denotes a predetermined threshold at which there are a plurality of pixels belonging to 0 to A graylevels.

24. The method of claim 22, further comprising computing R"G"B" pixels which are compensated by mathematical formula:

$$R''=\min(255,R'*(f_{IIR}(1/R_{GD}))^{\gamma})$$

$$G''=\min(255,G'*(f_{IIR}(1/R_{GD}))^{\gamma})$$

$$B''=\min(255,B'*(f_{IIR}(1/R_{GD}))^{\gamma})$$

where $f_{IIR}$ denotes an Infinite Impulse Response (IIR) low pass filter, and γ denotes a gamma compensation coefficient.

25. The display apparatus of claim 1, wherein the light emitter corresponding to the local area comprises a plurality of light-emitting diodes, a plurality of cold cathode fluorescent lamps, a plurality of field-effect diodes, or a plurality of surface-conduction electron-emitter displays.

* * * * *